E. J. TOMLINSON.
CLUTCH.
APPLICATION FILED NOV. 11, 1916.
1,323,797.
Patented Dec. 2, 1919.
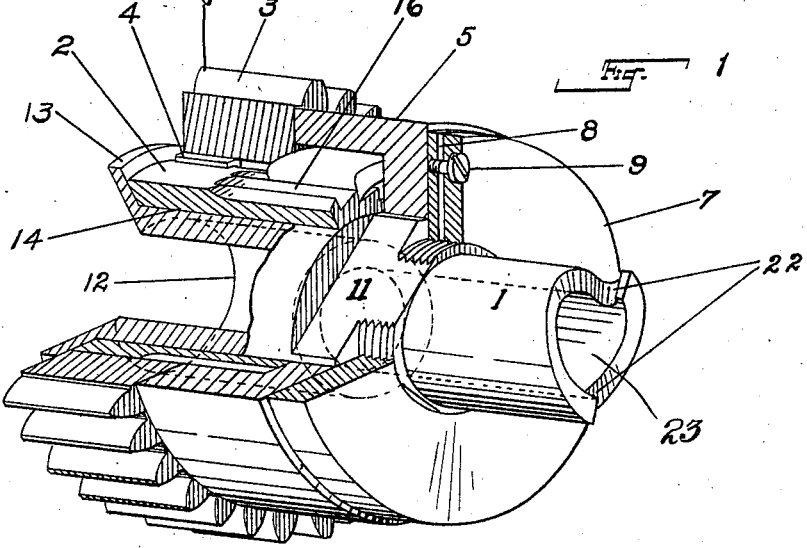
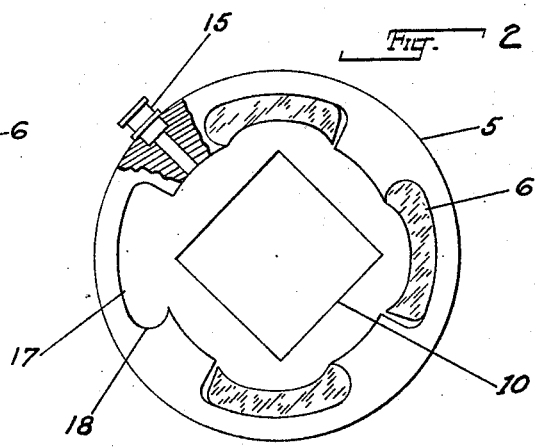
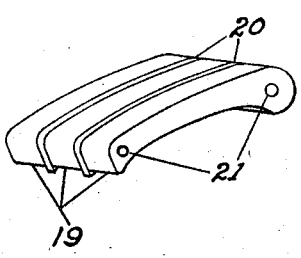
INVENTOR
Edward J. Tomlinson
Albion D. T. Libby
ATTORNEY

UNITED STATES PATENT OFFICE.

EDWARD J. TOMLINSON, OF NEWARK, NEW JERSEY, ASSIGNOR TO SPLITDORF ELECTRICAL COMPANY, OF NEWARK, NEW JERSEY.

CLUTCH.

1,323,797.   Specification of Letters Patent.   Patented Dec. 2, 1919.

Application filed November 11, 1916. Serial No. 130,799.

*To all whom it may concern:*

Be it known that I, EDWARD J. TOMLINSON, a citizen of the United States, a resident of Newark, in the county of Essex and State of New Jersey, have invented certain new and useful Improvements in Clutches, of which the following is a specification.

The object of my invention is to produce a clutch which is small and compact, strong and durable, for use in connecting a starting motor to an internal combustion engine.

Heretofore various types of clutches have been used but considerable valuable space has been taken up by such devices. My clutch, in its preferred form, is adapted to be made into a very small and compact device.

One of the objects of my invention, in addition to the general object above stated, is to provide a clutch of the so-called self releasing type whereby after the starting motor has cranked the engine, the engine driven member of the clutch will run away from the power motor driven member.

Other and further objects of my invention will be apparent to those skilled in the art after a study of the specification and drawings attached hereto.

In the accompanying drawing Figure 1 illustrates a perspective view of my complete clutch with a portion broken away so as to show the interior construction thereof.

Fig. 2 is an end elevation of one of the clutch members.

Fig. 3 is a perspective view of one of the pawls shown in Fig. 2.

Fig. 4 is a modified form of construction of pawl shown in Fig. 3.

As shown in the drawing the clutch consists of certain instrumentalities of which 1 is a sleeve member adapted to be fastened to the engine shaft. 2 is a ratchet gear member within which the sleeve member 1 is adapted to freely turn. 3 is a sprocket wheel securely mounted on the ratchet gear member 2 receiving its main driving connection therefrom through the medium of key 4. Mounted on the sleeve 1 is an exterior clutch member 5, and as shown in Fig. 2 the clutch member 5 is adapted to carry pawls 6 of which four are shown. To hold the exterior clutch member 5 in position on the sleeve 1 a lock nut 7 is used. The lock nut 7 is slotted at 8 and a screw 9 is used to draw the portions of the nut 7 of opposite sides of the slot 8 together so as to pinch on the screw threads on sleeve 1. The clutch member 5 has a square hole 10 therein. The sleeve 1 is square for a short portion of its length, one side of the square being shown at 11, for the purpose of fitting the square hole 10 in clutch member 5. The sleeve 1 has a hole 23 which passes all the way through it and the rear end of sleeve 1 is counterbored at 12 to the proper depth, which counterbore is larger than hole 23 and is adapted to fit onto the crank shaft of the engine. In the form shown I prefer to heat the end of sleeve 1 at the counterbored end 12 so as to enlarge the same then slip this end onto the engine shaft, allowing the sleeve to shrink to the shaft. The front end of sleeve 1 is notched at 22 for the purpose of taking a hand starting crank as is the usual practice.

The rear end of sleeve 1 has a collar 13 to act as a stop for the ratchet gear member 2. The sprocket wheel 3 is adapted to receive a chain for the purpose of connecting to a sprocket wheel on the power motor which is in the majority of cases electric.

In order to lubricate the bearing surface 14 between the sleeve 1 and the ratchet gear member 2 I provide an oil cup 15 of any suitable type which is mounted on member 5 and has a passage leading to the interior of the clutch. The ratchet gear 2 may have a small hole therethrough adjacent to the oil cup 15 so as to directly carry the oil through to the bearing surface 14. I have also found that the oil will work along the teeth 16 and pass over the end of the ratchet gear member 2 onto the bearing surface 14.

Referring to Fig. 2 it will be noted that the pawls 6 are laid loosely into a recess 17 and transmit the strain directly to the abutments 18 without the medium of any pins usually used in connection with a pawl and ratchet clutch.

In the operation of my device, current is applied to the starting motor which in turning, through the medium of the chain, power is transmitted to the sprocket wheel 3 which being fastened to the ratchet gear member of the clutch 2 starts this in rotation against the pawls 6 some of which by gravity will be in position to engage the gear member 2. Motion is thereby transmitted to clutch member 5 and thence to the sleeve 1 and to the engine shaft. When the engine "picks up" under its own power it drives the member 1 faster than the motor driven members 2 and 3 and member 5 carrying the pawls runs away from these members and on account of centrifugal force the pawls 6 are thrown into the recesses 17 out of the path of movement of the teeth 16 of ratchet gear member 2. Should it be found necessary to deaden the sound of the pawls as they drop onto the ratchet teeth at low speeds of the engine, I may use the modified form of pawl shown in Fig. 4, which is made up of punchings 19 having sound deadening material 20 of leather or other suitable material therebetween and being riveted securely together by means of rivets 21.

It will be readily noted that various other modifications and alterations may be made by those skilled in the art and I therefore do not wish to limit myself to the precise construction of details shown.

Having thus described my invention what I claim is:—

1. In a clutch, the combination of a driven sleeve having an upturned flange at one end and flat surfaces at the other end, a driving member supported on the sleeve and abutting against said flange, said driving member consisting of a ratchet gear wheel having teeth cut directly on one end of its periphery and a second gear wheel mounted on the other end of the first mentioned gear wheel with a positive driving connection between said gear wheels, a member removably mounted on said flat surfaces of said sleeve and extending over the sleeve toward said flange adjacent to said driving member and means carried by the member removably mounted on the flat surfaces of the sleeve for engaging and disengaging the first mentioned ratchet gear wheel constituting a part of the driving member.

2. In a clutch, the combination of a driven sleeve having a driving member supported on one end thereof, said driving member consisting of two gear members one within the other and drivingly secured together, a member drivingly but removably mounted on the other end of said sleeve adjacent to said driving member and having a portion overlapping the teeth of said inner gear member and abutting against the outer gear wheel constituting said driving member, means loosely carried by the member removably mounted on the sleeve for engaging and disengaging the teeth on the inner gear member and means on the opposite end of the sleeve from that carrying the removably mounted member for positioning the said gears on the sleeve.

3. In a clutch, the combination of a sleeve member having a counterbore at one end, threads cut on the opposite end thereof and flat surfaces formed on the sleeve between the threaded portion and the counterbored portion, an annular ring carried by that end of the sleeve over the counterbored part, said ring having teeth cut in its outer periphery, a gear wheel drivingly mounted on said annular ring, a member mounted on the flat surfaces of said sleeve and over-hanging the gear teeth of said annular ring, pawls carried by said member to engage teeth on the said annular ring and a nut to engage said threads on the sleeve for holding all of said parts in operative position.

4. In a clutch, the combination of an inner sleeve having a counterbore and an upturned flange at one end with threads cut on the sleeve at the other end and flat surfaces between the threaded part and the counterbored part, an annular ring adapted to be mounted on the sleeve abutting against said upturned flange said annular ring having teeth cut on its outer periphery, a gear wheel drivingly carried by said annular ring and abutting against said upturned flange on the sleeve, a member drivingly carried by the flat surfaces of said sleeve and extending over the teeth on said annular ring and abutting against the said gear wheel, pawls carried by this member for engaging and disengaging the teeth on said annular ring and means carried by said threaded portion of the sleeve for holding all of said members in working position.

5. In a clutch, the combination of a driven sleeve having a driving member supported on one end thereof and having flat surfaces on the other end, said driving member consisting of an internal ratchet gear wheel and an external gear wheel drivingly connected, a member drivingly mounted on the flat surfaces of said sleeve and extending over a part of the inner of said gear wheels constituting the driving member, said over-hanging portion serving to carry means for engaging the inner of said gear wheels and also serving as a housing for said gear wheel and engaging means, and means carried by said sleeve for holding all of the previously mentioned parts in operative position.

6. In a clutch, the combination of a driving and a driven member, said driven member consisting of a sleeve having one end counterbored and an upturned flange adjacent the open end of said counterbore and notches at the other end of said sleeve and a cup shaped member drivingly mounted intermediate the two ends of said sleeve, said cup shaped member having enlarged portions on its inner periphery thereby forming recesses, said driving member consisting of a ratchet wheel and a gear wheel arranged one within the other and drivingly connected, both said wheels carried by said sleeve and abutting against the upturned flange of the sleeve, the said ratchet wheel projecting beyond the plane of the said gear wheel and within the said cup shaped member, pawls adapted to be mounted within the recesses of the cup shaped member and to engage the teeth of the ratchet wheel projecting within said cup shaped member for the purpose described.

7. In a clutch, the combination of a driving and a driven member, said driven member consisting of a sleeve having one end counterbored and an upturned flange adjacent the open end of said counterbore and notches at the other end of said sleeve and a cup shaped member drivingly mounted intermediate the two ends of said sleeve, said cup shaped member having enlarged portions on its inner periphery thereby forming recesses, said driving member consisting of a ratchet wheel and a gear wheel arranged one within the other and drivingly connected, both said wheels carried by said sleeve and abutting against the upturned flange of the sleeve, said ratchet wheel projecting beyond the plane of the said gear wheel and within the said cup shaped member, pawls adapted to be mounted within the recesses of said cup shaped member for the purpose of engaging the teeth of the inner ratchet wheel of the driving member, said enlarged portions of the inner periphery of the cup shaped member serving as abutments to transmit the strain directly from the pawls to the cup shaped member for the purpose described.

8. In a clutch, the combination of a driving and a driven member, said driven member consisting of a sleeve having one end counterbored and an upturned flange adjacent the open end of said counterbore and notches at the other end of said sleeve and a cup shaped member drivingly mounted intermediate the two ends of said sleeve, said cup shaped member having enlarged portions on its inner periphery thereby forming recesses, said driving member consisting of a ratchet wheel and a gear wheel arranged one within the other and drivingly connected, both said wheels carried by said sleeve and abutting against the upturned flange of the sleeve, said ratchet wheel projecting beyond the plane of the said gear wheel and within the said cup shaped member, pawls adapted to be mounted within the recesses of said cup shaped member for the purpose of engaging the teeth of the inner ratchet wheel of the driving member, said enlarged portions of the inner periphery of the cup shaped member serving as abutments to transmit the strain directly from the pawls to the cup shaped member, and means carried by said pawls for the purpose of producing noiseless operation of the same as they pass over the coöperating teeth of the ratchet wheel, substantially as described.

9. In a clutch, a unitary structure consisting of a driven sleeve having an upturned flange at one end thereof and having flat surfaces on the other end and carrying a driving member adjacent to said flange, said driving member being composed of a ratchet wheel and a gear wheel, one within the other and securely fastened together, the inner ratchet wheel having its teeth projecting longitudinally of the sleeve beyond the plane of the outer gear wheel, pawls adapted to engage said inner gear wheel and a member for carrying said pawls mounted on the flat surfaces of said sleeve and projecting over the teeth of the inner ratchet wheel and abutting against the teeth of the outer gear wheel, and means carried by said sleeve for holding all of the previously mentioned parts in operative position between it and said flange.

In witness whereof I affix my signature.

EDWARD J. TOMLINSON.